3,255,522
ABRASION RESISTANT MATERIAL BONDING PROCESS USING BORON ALLOYS
George Herbert Bull, Barnet, England, Peter Leslie Timms, Houston, Tex., and Anthony Arthur Robinson Wood, Dorking, England, assignors to United States Borax and Chemical Corporation, Los Angeles, Calif.
No Drawing. Original application Sept. 7, 1962, Ser. No. 222,169. Divided and this application Apr. 9, 1965, Ser. No. 447,054
Claims priority, application Great Britain, Oct. 3, 1961, 35,662/61
14 Claims. (Cl. 29—471.1)

This application is a division of our co-pending application Serial No. 222,169 filed September 7, 1962.

This invention relates to abrasion-resistant materials and more particularly concerns composites comprising abrasion-resistant materials and their production.

Considerable interest, for example, as potential tool materials, has recently been aroused in abrasion-resistant materials which consist of or contain boron, such as the borides of titanium, zirconium, hafnium, vanadium, chromium, tantalum, tungsten, niobium, molybdenum, aluminum, manganese, iron, nickel and cobalt, and of the alkaline earth and rare earth metals, boron carbide, boron phosphide, boron arsenide, boron silicide and boron itself. These materials, which are characterized by high hardness and high melting point are referred to herein as "boron-based abrasion-resistant materials." Cutting tools have been fabricated from similar abrasion-resistant materials, e.g., the abrasion-resistant carbides, by cementing together a mass of the abrasion-resistant material in particulate form with a metallic binder, nevertheless although such diverse metals as copper, iron, nickel, cobalt, silver and aluminum have been suggested as binders for cemented boron-comprising abrasion-resistant materials, none of these give entirely satisfactory results, and in many cases require too high a temperature for formation of the bond between the particles.

It has now been found that alloys of copper or silver with boron when melted in contact with boron-based abrasion-resistant materials wet them well at temperatures easily attainable in practice and allow the formation of a strong bond between them, and are therefore of considerable interest as binders and the like in the production of cutting tools.

According to one aspect of the present invention there is provided a composite of a boron-based abrasion-resistant material directly bonded to copper-boron or silver-boron alloy. The amount of boron in the alloy may be quite small, copper/boron alloys for example containing 0.1 to 10%, say about 1–2% of boron giving excellent results. The composite may take various forms, for example a cemented cutting tool or other article may comprise particles of the abrasion-resistant material bonded together with the aid of the alloy, or a surface of a mass of the abrasion-resistant material may be directly bonded to a layer of the alloy. Composites of the last mentioned type may be united through the alloy layer to a surface of another material which forms a direct bond with the alloy. For example, copper or alloys thereof, such as brass or bronze, containing a major proportion (at least 50% by weight) of copper may be united to a mass of an abrasion-resistant boride, such as titanium diboride, through a layer of copper-boron alloy. This procedure is useful for attaching copper or copper alloy conductors to boride electrodes.

The composites may, according to a further aspect of the invention, be prepared by heating the alloy at a temperature of at least its eutectic temperature in contact with the abrasion-resistant material in solid form and then cooling the alloy below the eutectic temperature. For example, an intimate mixture of particles of the abrasion-resistant material with powdered binder alloy may be sintered at such a temperature and then cooled below the eutectic temperature to produce a cemented article. The alloy may be melted on a surface of a solid mass of the abrasion-resistant material thereby producing a composite which may be readily soldered or brazed to another metal surface. If desired the copper-boron or silver-boron alloy may be formed in situ. For example a surface of a mass of a boride such as titanium diboride may be coated with finely powdered boron, and copper or an alloy therefore is melted in contact with the coated surface. On cooling, the copper is found to be firmly bonded to the boride. The amount of boron employed is preferably 0.05 to 0.2 mg./sq. cm. of surface, but higher loadings may be employed, for example up to 1 mg./sq. cm.

Temperatures involved in producing the composites obviously depend on the particular alloy used. For the preferred copper/boron alloys containing 0.1 to 10% of boron, temperatures as low as 1100°–1200° C. are quite satisfactory.

In the composites of the present invention the alloy is directly bonded to the abrasion-resistant material and no adhesion promoting layer is required. It is to be understood that some interaction may occur between the abrasion-resistant material and the alloy at the interface, and that such composites are included within the scope of the invention.

*Example I*

The following example describes the production of a composite according to the invention and shows the advantage of using a copper boron alloy in the production of composites compared with copper alone:

Titanium diboride pellets were mounted in pairs one above the other with a layer of powdered copper between them. Other pellets were mounted similarly with powdered copper-boron alloy containing 2% of boron between each pair. The pellets were introduced to a furnace at 1200° C. and after 3 minutes, removed and cooled. The pellets mounted with copper broke easily and showed no bond between the copper and the titanium diboride. The pellets mounted with copper boron alloy were parted only with difficulty and it was found that fracture had taken place in one of the titanium diboride pellets, away from the join with copper boron alloy.

By an analogous procedure, the titanium diboride pellets may be firmly bonded together by means of silver-boron alloys.

*Example II*

Nine parts of powdered titanium diboride and one part of an alloy of copper and boron (containing 2% by weight of boron) were intimately mixed by milling. The resulting powder was pressed into a number of pellets of diameter about 1.3 cm. and weighing 2–4 grams using pressures between 780 and 3940 kg./sq. cm. The pressed pellets were placed on an alumina tray and heated in an atmosphere of hydrogen in an alumina furnace tube at a temperature between 1150° and 1250° C. for 2 hours. The pellets were then allowed to cool while the atmosphere of hydrogen was maintained. In the final pellets, the particles of titanium diboride were found to be strongly bonded together by the copper-boron alloy.

*Example III*

Example II was repeated except that the pressed pellet was heated for 4 hours in vacuo at temperatures of 1400°–1450° C. In the final pellets, the titanium diboride particles were also strongly bonded together by the alloy.

Example IV

The following example illustrates the bonding of copper to a titanium diboride electrode with the aid of a copper-boron alloy.

A small quantity of copper-boron alloy (containing 2% by weight of boron) was placed on the upper surface of a titanium diboride electrode of diameter 2.5 cm., contained within a graphite die. The copper-boron alloy was heated to about 1200° C. by means of a high frequency electric current and then molten copper was cast on top of the alloy-coated electrode surface. On cooling, the copper was found to be firmly bonded to the electrode and was suitable for connection to a conventional copper bus bar.

Many of the abrasion resistant materials, useful in the present invention, especially titanium diboride, have excellent electrical conductivity and are suitable for making electrodes which can be used in, for example, the production of aluminum. The expression "abrasion-resistant materials" does not imply that the bonded materials have to be used in such a way that their abrasion resistance is important. For example as stated above, one important application of the invention is the formation of a strong and highly conducting bond between copper or copper alloy conductors and electrodes of titanium diboride and the like.

We claim:

1. A process for producing composites which comprises heating an alloy of boron with a Group IB metal selected from the class consisting of copper and silver in contact with a boron-based abrasion-resistant material in solid form at a temperature not lower than the eutectic temperature of the alloy and, while the alloy and the abrasion material are still in contact, cooling the alloy below its eutectic temperature.

2. A process according to claim 1, wherein a surface of a shaped mass of the abrasion resistant material is coated with powdered boron, a metal containing 50-100% of copper is melted in contact with the coated surface and the molten metal is then solidified by cooling.

3. In the method for forming a composite of particles of boron-based abrasion-resistant material bonded together with a metal bonding agent, the improvement which comprises bonding said particles together with an alloy consisting essentially of from 0.1% to 10% by weight of boron and the balance being selected from the group consisting of copper and silver.

4. In a method for forming a composite of particles of a boron-based abrasion-resistant material selected from the group consisting of the metal borides, boron carbide, boron phosphide, boron arsenide, boron silicide and boron, the improvement which comprises bonding said particles together with an alloy consisting essentially of from 0.1% to 10% by weight of boron and the balance being selected from the group consisting of copper and silver.

5. The method according to claim 4 in which said alloy contains from 1 to 2% by weight of boron and the balance is copper.

6. The method according to claim 4 in which said boron-based abrasion-resistant material is titanium diboride.

7. In the method for bonding a shaped mass of boron-based abrasion-resistant material to a second shaped mass, the improvement which comprises bonding said shaped masses together with an alloy consisting essentially of from 0.1% to 10% by weight of boron and the balance being selected from the group consisting of copper and silver.

8. The method according to claim 7 in which said alloy consists essentially of from 1 to about 2% by weight of boron and the balance is copper.

9. The method according to claim 7 in which said alloy consists essentially of from 1 to about 2% by weight of boron and the balance is silver.

10. The method according to claim 7 in which said boron-based abrasion-resistant material is titanium diboride.

11. In the method for forming an electrode assembly for the electrolytic production of aluminum comprising a titanium diboride electrode bonded directly to a copper connector, the improvement which comprises bonding said titanium diboride to said copper with an alloy consisting essentially of from 0.1% to 10% by weight of boron and from 90% to 99.9% by weight of copper.

12. The method according to claim 11 in which said alloy contains from 1 to 2% by weight of boron and the balance is copper.

13. In the method for forming an electrode assembly for the electrolytic production of aluminum comprising a titanium diboride electrode bonded directly to a copper connector, the improvement which comprises bonding said titanium diboride to said copper with an alloy consisting essentially of from 0.1% to 10% by weight of boron and from 90% to 99.9% by weight of silver.

14. The method according to claim 13 in which said alloy contains from 1 to 2% by weight of boron and the balance is silver.

References Cited by the Examiner

UNITED STATES PATENTS

| | | | |
|---|---|---|---|
| 1,913,373 | 6/1933 | De Golyer | 75—202 X |
| 1,977,128 | 10/1934 | Hawkins | 29—191.2 |
| 2,084,349 | 6/1937 | Laise | 75—202 |
| 2,367,286 | 1/1945 | Keeleric | 29—191.2 |
| 2,854,332 | 9/1958 | Bredzs et al. | 75—153 |
| 2,891,860 | 6/1959 | Woolard | 75—153 X |
| 2,964,397 | 12/1960 | Cooper | 75—153 |
| 3,047,938 | 8/1962 | Dega | 75—202 X |
| 3,054,671 | 9/1962 | London et al. | 75—153 |
| 3,148,052 | 9/1964 | New | 75—173 X |

HYLAND BIZOT, *Primary Examiner.*

DAVID L. RECK, *Examiner.*

H. W. TARRING, *Assistant Examiner.*